(No Model.) 2 Sheets—Sheet 1.
W. G. SCHAFHIRT.
ROUNDABOUT.
No. 511,910. Patented Jan. 2, 1894.
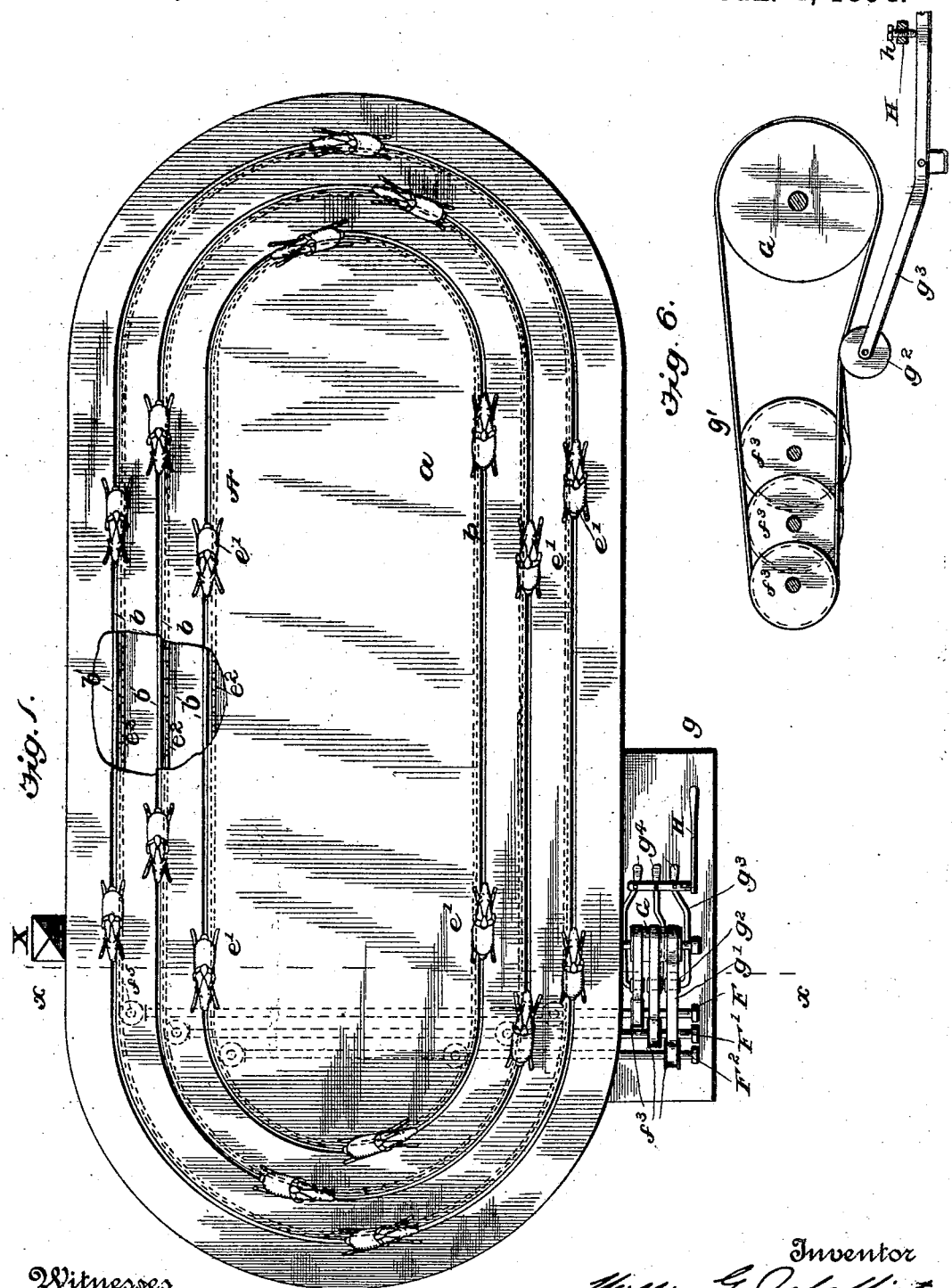
Witnesses
Inventor
Attorney

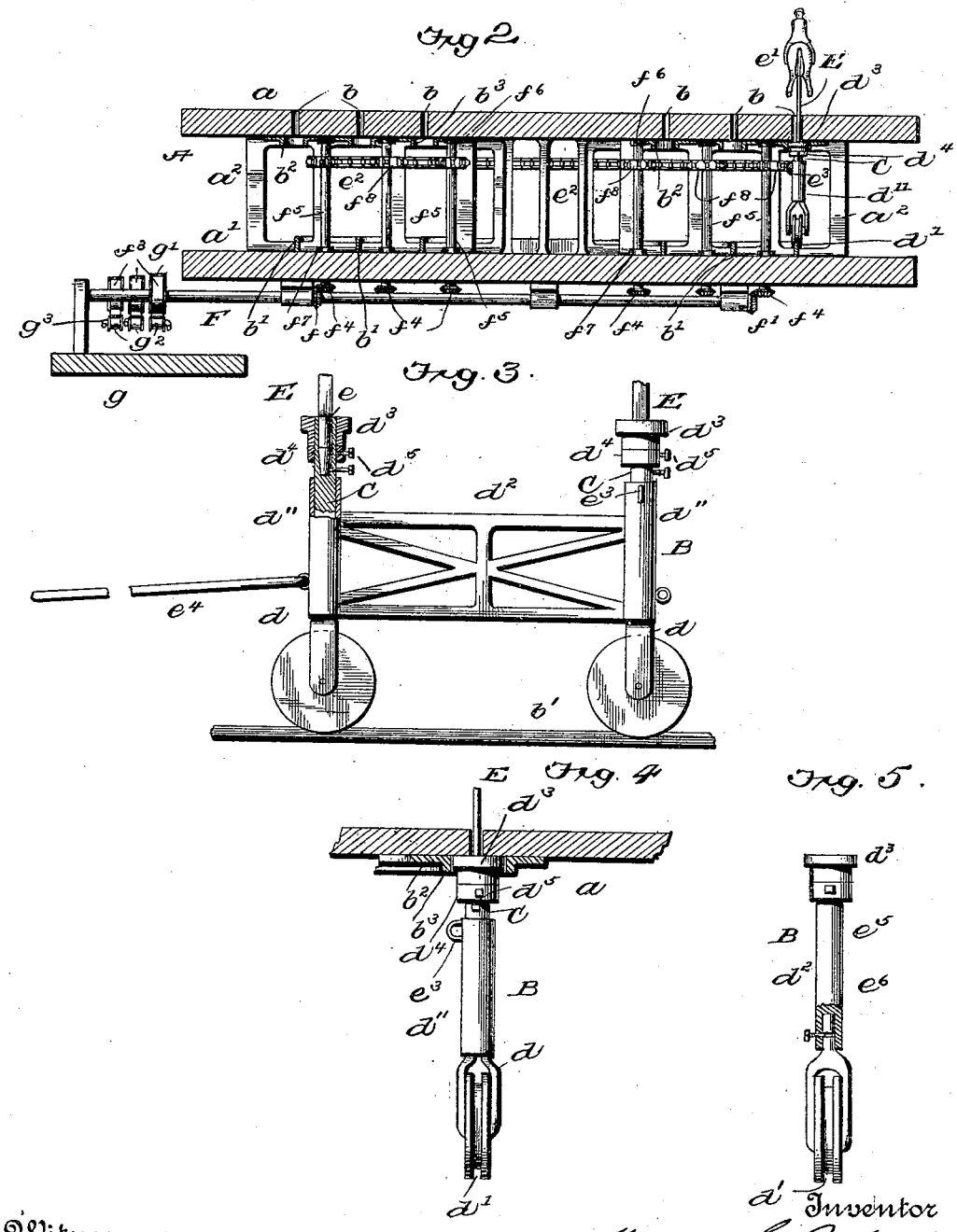

beveled gear-wheels engaging said former gear wheels, and means for operating said horizontal shafts, substantially as set forth.

5. In a roundabout, the combination with the series of continuous parallel raceways, and the series of trucks together with their connecting chains, of the driving shafts for operating said series of trucks, the pulleys on said shafts, the driving belts, the main drum, and means for operating the same, substantially as set forth.

6. In a roundabout, the combination with the series of continuous parallel raceways, and the series of trucks together with their connecting chains, of the driving shafts for operating said series of trucks, the pulleys on said shafts, the driving belts, the main drum, means for operating the same, and the series of levers carrying pulleys for independently binding said belts, as and for the purpose set forth.

7. In a roundabout, the combination with the series of continuous parallel raceways, and the series of trucks together with their connecting chains, of the driving shafts for operating said series of trucks, the pulleys on said shafts, the driving belts, the main drum, means for operating the same, the series of levers carrying pulleys for independently binding said belts, and the lever H for operating said levers, substantially as set forth.

8. In a roundabout, the truck herein-described, comprising the spindles having lower bifurcated ends, the wheels journaled in said ends, the upper rollers, the connecting frames, and the supporting standards extended from said spindles, as set forth.

9. The herein-described improved roundabout consisting of the platform having a series of continuous parallel slots, the base having tracks, the series of trucks the spindles thereof having wheels movable on said tracks, the upper rollers, the guide tracks therefor, the connecting frames between said spindles, the series of sprocket chains connecting the trucks of each series, the vertical shafts having sprocket wheels engaging said chains, the series of horizontal shafts, the bevel connections between said vertical and horizontal shafts, the pulleys on said horizontal shafts, the driving drum, the endless belts encircling the latter and said pulleys, and the series of levers carrying pulleys for binding said belts, substantially as set forth.

In testimony whereof I have signed this specification in the presence of two subscribing witnesses.

WILLIAM G. SCHAFHIRT.

Witnesses:
J. NOTA MCGILL,
WILLIAM S. HODGES.

(No Model.)
A. E. SCHATZ.
CANAL BOAT PROPELLER RAIL.
No. 511,911. Patented Jan. 2, 1894.
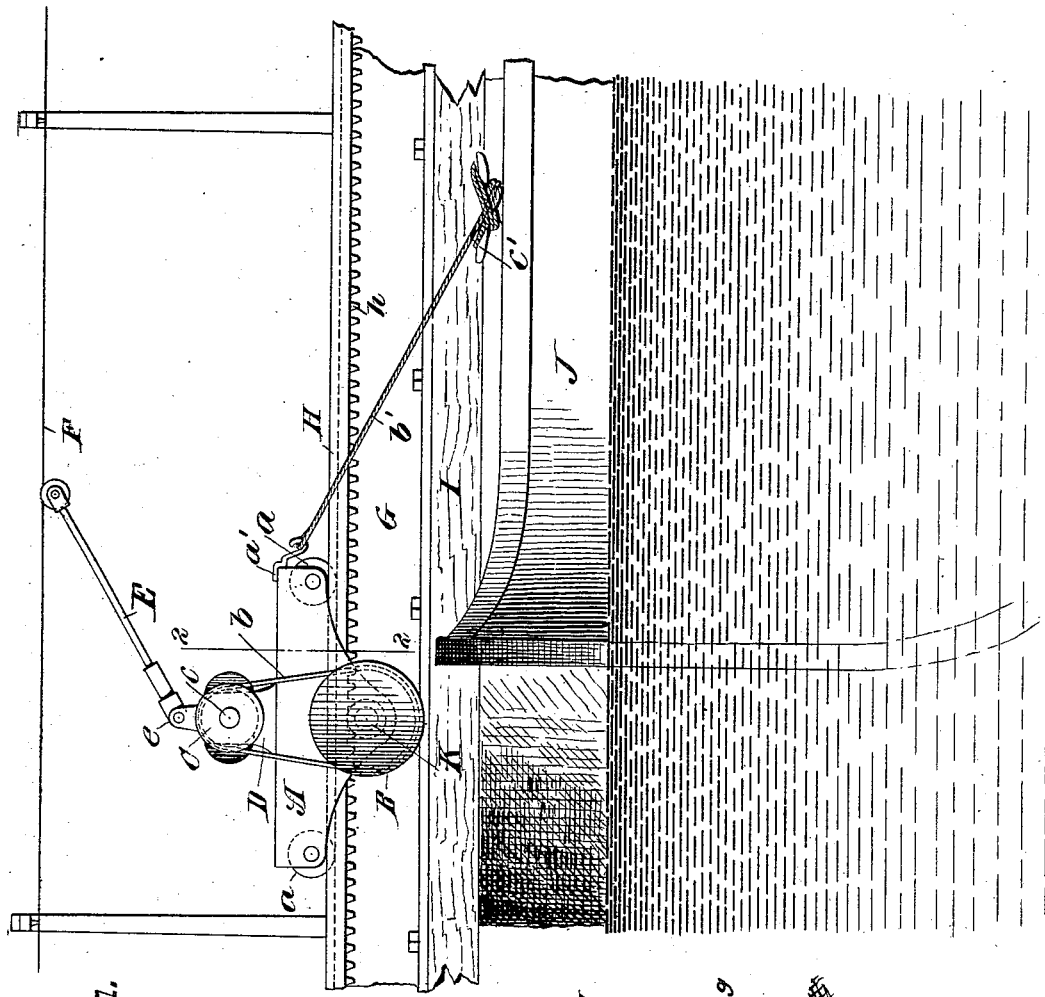
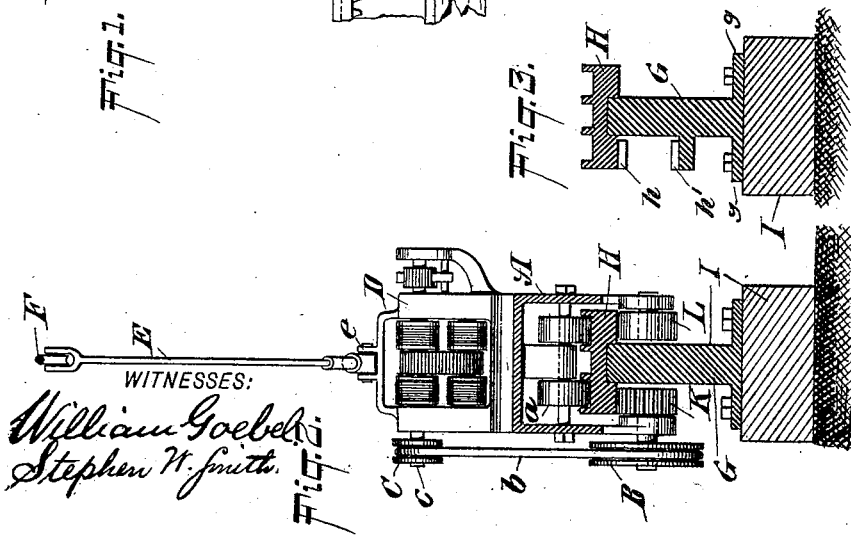
WITNESSES:
William Goebel
Stephen W. Smith
Adam E. Schatz
INVENTOR